United States Patent [19]

Heinrich

[11] Patent Number: 4,769,660
[45] Date of Patent: Sep. 6, 1988

[54] PIN-HOLE TYPE CAMERA

[76] Inventor: Robert G. Heinrich, 5244 Cribari Hills, San Jose, Calif. 95135

[21] Appl. No.: 145,127

[22] Filed: Jan. 19, 1988

[51] Int. Cl.$^4$ .................... G03B 9/10; G03B 17/02
[52] U.S. Cl. .................................... 354/120; 354/147; 354/254; 354/288
[58] Field of Search ............... 354/120, 129, 202, 250, 354/254, 255, 266, 288, 147, 187

[56] References Cited

U.S. PATENT DOCUMENTS

| | | | | |
|---|---|---|---|---|
| 582,855 | 5/1897 | Freeman | | 354/187 |
| 1,191,066 | 7/1916 | Cramer | | 354/288 |
| 1,222,310 | 4/1917 | Lichtman | | 354/288 |
| 1,366,158 | 1/1921 | Brown | | 354/288 |
| 2,751,825 | 6/1956 | Fried | | 354/288 |
| 3,069,987 | 12/1962 | Camera | | 354/120 |
| 3,323,432 | 6/1967 | Rabanit | | 354/120 |
| 3,640,195 | 2/1972 | Zimmerman et al. | | 354/288 |
| 4,329,037 | 5/1982 | Caviness | | 354/288 |
| 4,660,951 | 4/1987 | Reed et al. | | 354/187 |

Primary Examiner—A. A. Mathews
Attorney, Agent, or Firm—Lloyd F. Seebach

[57] ABSTRACT

The invention relates to a pin-hole type camera in which the camera casing is divided into a plurality of light-tight sections, each of which is provided with a pin-hole, a shutter mechanism, a shutter release and flash means for exposing in random order adjacent areas of a single strip of light-sensitive material arranged in relation to the plurality of sections and the pin-hole associated with the respective section.

5 Claims, 1 Drawing Sheet

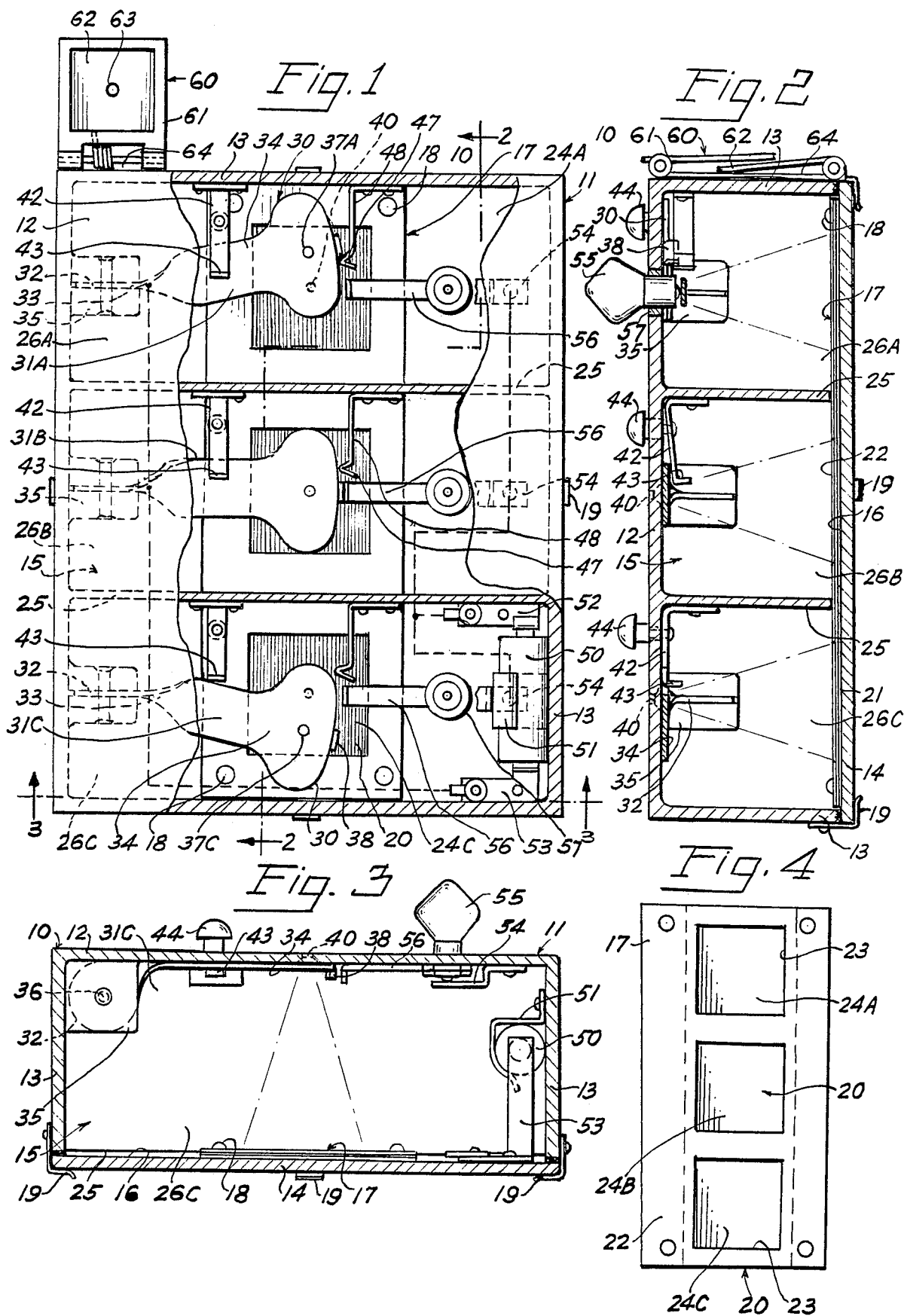

PIN-HOLE TYPE CAMERA

FIELD OF THE INVENTION

The present invention relates to a pin-hole type camera in which a strip of light-sensitive material has adjacent areas exposed through a pin-hole associated with each of a number of sections in the camera casing for providing random selection of the area to be exposed without movement of the strip of light-sensitive material.

DESCRIPTION OF THE ART

A search of the prior art revealed a number of U.S. patents disclosing a camera with either a pin-hole or a simple lens through which the image is exposed onto a light-sensitive material. In each instance, the light-sensitive material is in the form of a roll or sheet; in the latter case, the sheet being one of a number assembled in a cassette in which each sheet is usually separated from an adjacent sheet by a sheet of black paper, the exposed sheet and next black sheet having to be removed before the next exposure is made. In the prior art, the cameras for the most part include a single pin-hole or a single lens with the light-sensitive material having to be moved or a new area brought into position for exposing with each successive exposure that is made. The cameras are of various materials some of which are made of heavy paper or cardboard and are meant to be disposed of as soon as the roll of light-sensitive material or the cassette of sheets have been exposed. Such cameras are disclosed in the following U.S. patents; namely, U.S. Pat. Nos. 582,855 and 1,222,310 (plate holder cameras); U.S. Pat. No. 1,191,066 (roll holder camera); U.S. Pat. No. 1,366,158 (pin-hole, film pack or cassette camera); and U.S. Pat. No. 2,751,825 (pin-hole, roll holder camera).

In some patents, such as in U.S. Pat. No. 4,329,037, the purpose of the camera is to teach the basics of photography without the need of costly and complicated shutters, lenses and film winding apparatus. In another reference, such as U.S. Pat. No. 4,660,951, the simple type of camera disclosed therein is one that may be used to record a photograph of a house, building, etc., for issuance of insurance, or rental or sale and, at the same time, to readily develope the film so as to have a picture within a short time. It is also desirable in such a camera that it be collapsible in order to mail in an easy and less bulky manner to the insurance applicant or to issue a single photograph that is developed within the camera, the latter then being discarded after a single use.

In the camera disclosed in the present application, the purpose is to provide a camera which can be used to readily record an event, such as an accident, robbery or other action, by taking a number of pictures and have the light-sensitive material or film available for immediate exposure and, at the same time, have a substantially instant record of the event that has occurred. For example, the present camera, by way of illustration, provides for three (3) exposures that can be made on a fixed strip of light sensitive material. Movement of the strip of light-sensitive material is not required to present another area thereof for exposure. In such a camera, a shutter is associated with each area of the light-sensitive material to be exposed, thereby requiring no manipulation of the light sensitive material in the exposure plane. While the prior art discloses cameras that utilize a pin-hole and some of which are disposable, there is no camera disclosed for exposing in random order each of a plurality of adjacent areas of a fixed strip of light-sensitive material as disclosed in the present application.

A pin-hole camera, as described above, can be made part of a motor vehicle requirement that such a camera be purchased for a nominal sum to record an accident or infraction of a motor vehicle law or regulation. After exposures have been made, the camera can be turned into the motor vehicle bureau, police, etc. and exchanged for another, again at a nominal sum. On the other hand, the exposed film in the camera can be removed and replaced with unexposed film for resale and reuse.

SUMMARY OF THE INVENTION

The object of the invention is to provide a pin-hole type camera in which a number of areas on a fixed strip of light-sensitive material can be exposed in random order.

Another object of the invention is to provide a camera having a body divided into a number of sections, each of which, in effect, provides a separate camera but each of which is related to a single fixed strip of light-sensitive material.

A still further object of the invention is to provide a camera that utilizes a pin-hole for exposure of a fixed strip of light-sensitive material, whereby anyone of several areas on the fixed strip of light-sensitive material can be exposed in random order and without double exposure of any one area.

Still another object of the invention is to provide a pin-hole type camera for exposing in random order each of a plurality of adjacent areas of a fixed strip of light-sensitive material in which the camera structure is not complex, and in which the camera is relatively simple and easy to operate so that an exposure can be made in a minimum period of time with a maximum result to provide an irrefutable record of an event.

These and other objects of the invention will be apparent to those skilled in the art by the description which follows.

Briefly, the objects of the invention are attained by a pin-hole type camera having a body which includes a casing having a front wall with an inner surface, a peripheral wall extending normally from the inner surface of the front wall, and a cover having an inner surface for engaging the peripheral wall to provide a substantially light-tight compartment. The strip of light-sensitive material that is to be exposed is mounted on the inner surface of the cover and extends generally the length of the cover. A plurality of dividers which are spaced from one another extend normally from the inner surface of the front wall for dividing the compartment into a plurality of individual sections. The free ends of the dividers engage the strip of light-sensitive material to maintain the latter in a fixed plane with respect to the inner surface of the cover, thereby dividing the strip of light-sensitive material into a plurality of adjacent areas. A pin-hole is associated with each section and the area of light-sensitive material therein for exposing the latter. A shutter member is pivotally mounted in each section on the inner surface of the front wall and with respect to the pin-hole associated with the particular section. Each shutter member is provided with an exposure aperture and is resiliently biased into a first position in which the shutter member is maintained normally for covering the associated pin-hole. Upon being released, the shutter member moves through a second position in which the exposure aperture is aligned with the associated pin-hole for exposing the area of light-sensitive material and into a third position for recovering the pin-hole. There is a release means arranged on the front wall of the casing and with respect to each section that is interconnected to the associated shutter member for releasing the latter while in its first position, thereby permitting the shutter to move through the second position and into the third position. The release means associated with each of the plurality of sections is independently and randomly operable for releasing the associated shutter member. The size of the camera is such that it can be readily carried in one's pocket or retained in the glove compartment or map pocket of an automobile. Its primary purpose is such that it is instantly available for use whenever necessary with a minimum number of operations required by the user to obtain a photographic record of an event as noted hereinabove.

DESCRIPTION OF THE DRAWING

Reference is now made to the accompanying drawing wherein like reference numerals and characters designate like parts and wherein:

FIG. 1 is a front view of a pin-hole type camera in accordance with the invention in which a portion of the front wall of the camera casing has been broken away to show the shutter and other elements arranged in each of the sections and the manner in which they can be operated;

FIG. 2 is a verticle section taken substantially along the line 2—2 of FIG. 1;

FIG. 3 is a sectional view taken substantially along the line 3—3 in FIG. 1; and FIG. 4 is a front view of a strip of light-sensitive material showing the manner in which the adjacent areas thereof are arranged for placement in each section as seen in FIG. 1.

DESCRIPTION OF PREFERRED EMBODIMENTS

With reference to FIG. 1, the camera 10 generally comprises two major elements: namely, a casing 11 consisting of a front wall 12 and a peripheral wall 13. The peripheral wall 13 extends normally from the front wall 12 and is engaged by a cover 14, which, in effect, provides a substantially light-tight compartment 15 in which the camera mechanisms are arranged as described hereinafter. As noted in FIG. 2, the cover 14 engages the peripheral wall 13 and the inner surface 16 of the cover 14 carries a film packette 17 which is mounted on the inner surface 16 by means of a plurality of pins 18, as shown also in FIG. 1. The cover 14 can be secured to the peripheral wall 13 in a number of ways depending on the materials used for the camera casing 11 and cover 14. An adhesive tape can be used to maintain the cover 14 in position. Spring clips 19 can be secured to the casing 11 for engaging the cover 14, see FIGS. 2 and 3. Also, in the event a plastic material is used, suitable metal fasteners can be utilized, and to insure a light-tight condition, a felt or plush gasket can be secured to the free end of wall 13.

The film packette 17 comprises a strip of light-sensitive material or film 20 which can be, for example, 16 mm, 35 mm or any other size perforated or unperforated film. As described hereinafter, a flash arrangement is associated with the camera; however, this may not be necessary if a high speed, light-sensitive material or film having a SAE number of 1,000 or more is used in the packette. Generally, the packette 17 merely comprises a backing material 21 of paper or a relatively stiff cardboard and a second sheet 22 that is provided with a number of exposure apertures 23 and which covers the film strip 20 mounted therebetween to provide adjacent film areas 24A, B and C. With such a packette, removal thereof from the camera or replacement would have to take place in a dark room. However, the packette 17 could take other forms depending on the desired complexity of the camera.

A plurality of dividers 25 extend normally from the front wall 12 and engage the film packette 17 on the cover 14 to provide a number of sections 26A, B and C in each of which a shutter mechanism generally designated by the number 30 is arranged. The dividers or walls 25, in effect, provide, as shown in FIG. 2, three light-tight sections 26A, B and C, each of which has an associated area 24 of the film strip 20 arranged therein for exposure in any random order, as will be described more fully hereinafter. The end of each divider can be provided with felt or a similar material for engaging the film packette 17 to insure a light-tight condition.

With respect to FIG. 1, there is shown a camera 10 having three sections 26 in each of which there is a shutter mechanism 30 arranged for exposing the associated film area 24 aligned therewith. In the uppermost section 26A, the shutter mechanism 30 is shown in its third position which is after an exposure has been made; in the central section 26B, the position of the shutter mechanism 30 is shown as an exposure is being made; and in the third section 26C, the position of the shutter mechanism 30 is shown as set which is prior to an exposure having been made. These three positions have been shown in FIG. 1 to clarify the actual movement and position of the shutter mechanism 30 in any one of sections 26 as exposure of the light-sensitive material takes place. The showing of three sections is not meant in any way to be a limitation of the invention per se.

The shutter mechanism 30 in each section 26 comprises a single blade member 31, which is made of a thin, relatively resilient material, such as beryllium copper, and the end 32 is twisted to provide a portion 33 that is generally normal to the blade surface 34. The end 32 is mounted between extensions 35 formed on the peripheral and front walls 12, 13 of the camera casing 11 and is anchored by a pin or dowel 36. The blade member 31 is provided with an exposure aperture 37 which is centrally located on the blade 31, and along the outer edge the blade member 31 is provided with a nib or extension 38. Due to the resiliency of the material with which the blade 31 is made, it can be sprung and held in a position as shown in the section 26C, see FIG. 1, in which the blade 31 covers the pin-hole 40 to prevent light from entering that particular section. The blade 31 is held in this position by a holding member 42 which is secured to the divider wall 25 and has a projection 43 which engages an edge of the blade 31 to hold it in this first position. The member 42 is connected through the front wall 12 of the camera casing 11 to a release member 44 which protrudes through the front wall for engagement or actuation by the holder of the camera.

When the release member 44 is moved inwardly, the projection 43 is moved out of the path of the blade 31 and permits the latter, due to its set resiliency, to move in an accurate path through a second position in which the exposure aperture 37 aligns itself with the pin-hole 40 to make an exposure, this position of the elements being shown in section 26B, see FIG. 1. As the blade 31 moves from the first position through the second position in which the exposure is made and into a third position, as shown in section 26A, see FIG. 1, the other end of the blade 31 serves to cover the pin-hole 40 to prevent light from entering the respective section. At the same time, projection 46 on blade member 31 engages the end 47 of a spring member 48 which is secured to the divider 25 to prevent rebound of the blade 31, thereby alleviating the possibility of the exposure aperture 37 becoming realigned with the pin-hole 40 due to hitting the wall or from natural resilient bounce. As described thus far, the actuation and operation of the shutter mechanism 30 with respect to each position thereof is shown in each section of the camera 10, each section 26 portraying a different position of the blade 31. With respect to FIG. 1, the three positions indicate that the section 26B is in the course of having its area 24B of the light-sensitive material 20 exposed, whereas in the section 26A the area 26A has already been exposed and in the third section 26C the blade 31 is still in a set position for making a subsequent exposure. It will be understood, of course, that when a camera of the type disclosed, is provided with three sections 26A, B and C, as shown in FIG. 1, all of the blade members 31A, B and C will be in the set position, as shown in the section 26C, when the camera is first sold or after the packette 17 has been replaced for further use.

In the event a flash unit is desirable, or is to be incorporated into a camera of the type disclosed, a battery-operated or electronic flash means can be readily utilized with the shutter mechanism 30 already disclosed. As shown in FIG. 1, a battery-operated flash unit can include a battery 50 which is mounted on the peripheral wall 13 by means of a spring clip 51 and between terminal members 52 and 53 secured to the cover 14, note section 26C. The terminal member 52 is serially connected to a suitable contact member 54 associated with a flash bulb 55 that is suitably mounted in the front wall 12 and with respect to each section 26A, B and C. The other side of the battery 50, that is, the terminal member 53, is serially connected to each of the blade members 31A, B and C. It will be noted by the dotted lines shown in FIG. 1 that these connections are made to each of the blade members 31A, B and C and to each of the flash bulbs 55 associated with a section 26. The connection from the blade member 31 to its associated flash bulb 55 is made by the extension 38 on the blade member 31 and a wiper arm 56 which forms a part of each socket 57 in the front wall 12 for retaining its respective flash bulb 55 in position. It will be noted in FIG. 1 that as a blade member 31 aligns its exposure aperture 37 with the associated pin-hole 40, as in section 26B, the extension 38 on the moving blade member 31 wipes across the arm 56 to complete the circuit for energizing the flash bulb associated with that particular section. The size or position of the extension 38 and of wiper arm 56 is such that the exposure aperture 37 and pin-hole 40 are aligned at substantially the peak of the flash bulb output. An electronic flash unit can utilize the same circuitry with minor changes.

If desired, a simple, folding view finder 60 can be provided and consists of a frame member 61 and a plate 62 with a sighting aperture 63, both the frame member and the plate being pivotally mounted on a support plate 64 that is attached in a suitable manner to the peripheral wall 13, as shown in FIGS. 1 and 2.

As set forth hereinabove, it can be readily appreciated by anyone skilled in the art that the camera casing and the various elements thereof can be made and/or extruded from materials that provide for the manufacture and assembly of a very inexpensive camera. For example, the camera casing and cover can be made from a relatively stiff cardboard or from an extruded plastic material that is relatively light in weight and will tolerate small wall thicknesses with maximum strength. The leads for the flash bulb circuitry can be be striped conductors thereby eliminating wiring and soldering connections. The camera per se, as set forth and described hereinabove, is of simple design and as a whole can be easily manufactured and readily assembled. Further, there are differences that can be effected without altering the operation, function or purpose of the invention, as described and disclosed hereinabove.

Accordingly, the invention has been described in detail with particular reference to preferred embodiments thereof, but it will be understood that variations and modifications can be effected within the spirit of the invention.

I claim:

1. A pin-hole type camera for exposing in random order each of a plurality of adjacent areas of a fixed strip of light-sensitive material, comprising:

a camera body including a casing having a front wall with an inner surface, a peripheral wall extending normally from the inner surface, and a cover having an inner surface for engaging the peripheral wall to provide a light-tight compartment;

a replacable strip of light-sensitive material mounted on the inner surface of the cover;

a plurality of spaced dividers extending normally from the inner surface of the front wall for dividing the compartment into a plurality of individual sections, the free ends of the dividers engaging the strip of light-sensitive material to maintain the latter in a fixed plane with respect to the inner surface of the cover and dividing the strip of light-sensitive material into a plurality of adjacent areas;

means comprising a plurality of pin-holes in the front wall of the casing, each pin-hole being associated with a section and the area of light-sensitive material therein for exposing the latter;

means comprising a shutter member pivotally mounted in each section on the inner surface of the front wall and with respect to the pin-hole associated with the section, each shutter member being provided with an exposure aperture, being resiliently biased into a first position in which the shutter member is maintained normally for covering the associated pin-hole, and being releasable for movement through a second position in which the exposure aperture is aligned with the associated pin-hole for exposing the area of light-sensitive material and into a third position for recovering the pin-hole; and release means arranged on the front wall of the casing with respect to each section and interconnected to the associated shutter member for releasing the latter when in its first position for movement through the second position and into the third position, the release means associated with each of the plurality of sections being independently and randomly operable for releasing its associated shutter member.

2. A pin-hole type camera in accordance with claim 1 including means mounted on the front wall of the casing with respect to each section for engaging the released shutter member upon movement into the third position to prevent rebound movement thereof.

3. A pin-hole type camera in accordance with claim 2 including flash means mounted on the front wall of the casing, circuitry interconnecting the flash means to an energy source arranged in one of the sections, and means associated with the shutter member in each section for energizing the flash means in timed relation to alignment of the pin-hole and exposure aperture of the released shutter member.

4. A pin-hole type camera in accordance with claim 3 wherein the shutter member in each section includes an extending portion for interconnection with the engaging means and the energizing means.

5. A pin-hole type camera in accordance with claim 1 wherein the release means maintains its respective shutter member against the inner surface of the front wall during movement of the shutter member from the first position through the second position and into the third position to alleviate any light leakage.

* * * * *